United States Patent

[11] 3,590,367

[72] Inventors Willie P. Ptomey
 2294 Janette Drive, Napa;
 Leland E. Broyles, 1066 Ross Circle, Napa, Calif. 94558; James E. Hein, 301 Dryden Drive, Vallejo, Calif.
[21] Appl. No. 809,879
[22] Filed Mar. 24, 1969
[45] Patented June 29, 1971
 Continuation-in-part of application Ser. No. 676,302, Oct. 18, 1967.

[54] PORTABLE MAGNETIC TEST APPARATUS FOR CONVERTING ALTERNATING CURRENT TO DIRECT CURRENT WITH MEANS TO COOL THE COMPONENTS
 1 Claim, 8 Drawing Figs.
[52] U.S. Cl. .................................................. 324/38
[51] Int. Cl. ........................................... G01r 33/12
[50] Field of Search ............................................ 324/38

[56] References Cited
 UNITED STATES PATENTS
 2,423,552 7/1947 Clarke ......................... 324/38
 2,481,937 9/1949 Mages ......................... 324/38
 2,644,921 7/1953 Lewkowski, Jr. ............. 324/38
 3,346,778 10/1967 Schroeder et al. ............ 324/38

Primary Examiner—Rudolph V. Rolinec
Assistant Examiner—R. J. Corcoran
Attorneys—Raymond I. Tompkins and Charles D. B. Curry ABSTRACT: A small, lightweight, compact, portable magnetic particle inspection unit having a full-time use duty cycle that delivers at least 400 amperes of half-wave direct current to a pair of test prods. The unit includes a transformer having a high voltage primary winding and a low voltage secondary winding that is connected to the test prods. A rectifier is provided for converting the secondary winding low voltage alternating current to pulsating direct current. A relay having a relay coil is connected in series with the primary winding and a switch is provided in series with the relay coil. The test prods are supported in a spaced apart position and the switch is supported near the test prods to provide a convenient method for turning on and off the current in the test prods. The diode of the rectifier is placed directly in the airflow path of a cooling device. The secondary of the transformer is connected to terminal jacks and the test prods are connected by flexible leads to plug in jacks.

INVENTORS
WILLIE P. PTOMEY
LELAND E. BROYLES
JAMES E. HEIN

BY Charles B Curry

ATTORNEY

PORTABLE MAGNETIC TEST APPARATUS FOR CONVERTING ALTERNATING CURRENT TO DIRECT CURRENT WITH MEANS TO COOL THE COMPONENTS

This a continuation-in-part of patent application Ser. No. 676,302, filed Oct. 18, 1967 by Willie P. Ptomey and Leland E. Broyles entitled "High Amperage Amplifier."

The invention described herein may be manufactured and used by or for the Government of the United States of America for governmental purposes without the payment of any royalties thereon or therefor.

The present invention relates to magnetic inspection equipment and more particularly to portable lightweight magnetic inspection equipment.

The inspection of materials by means of magnetic inspection is known to those skilled in the art. This inspection process involves the use of equipment that generates a pulsating DC current that is typically applied with a pair of prods to the object being examined. Prior to applying the DC current to the object, particles that may be magnetized, such as iron filings, are sprinkled on the surface of the object to be examined. Then the pulsating DC current is applied to the object and the iron filings orient themselves along the lines of force of the magnetic field induced into the object by pulsating DC current. If a defect or flaw exists in the object being examined, then the lines of force of the magnetic field will be distorted and the iron filings will occupy positions that follow this distorted orientation. By visual inspection it can be seen that the iron filings are distorted from the normal pattern and it is then known that the material being examined has a defect.

The primary disadvantages of previous equipment used for this purpose was that it was quite cumbersome and heavy and was not truly portable. As a result, most inspection was done by two-man teams at considerable expense.

The present invention overcomes this disadvantage in that a small, lightweight, compact, portable magnetic particle inspection unit is provided which has a full time use duty cycle and will deliver at least 400 amperes of half-wave direct current to the prods through a pair of cables. This has been accomplished by developing an electrical circuit and cooling system which will produce high amperage low voltage half-wave direct current and at the same time be compact, lightweight and portable. For example, one such complete unit weighs about 27 pounds and has a physical size of 6"×8"×12" which permits access to confined spaces. The meter circuit of the present invention is designed so that if a component fails, such as the rectifier, there is no DC output and therefore no reading of the meter as is desirable.

Other objects, advantages and novel features of the invention will become apparent from the following detailed description of the invention when considered in conjunction with the accompanying drawings wherein.

Figure 1:
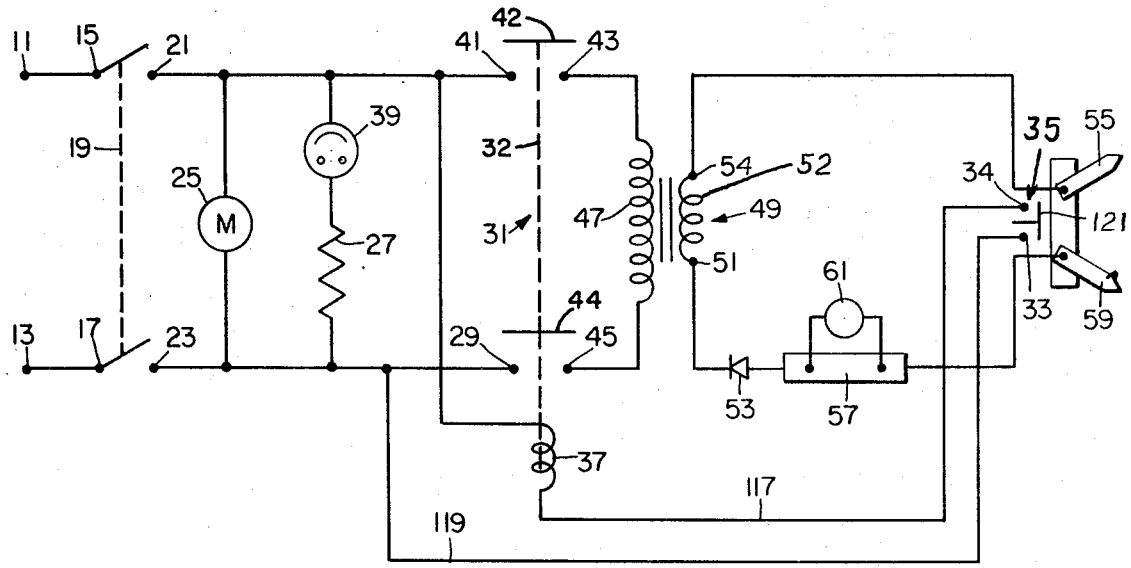
FIG. 1 is a schematic diagram of the electrical circuit of the present invention.

In FIG. 1 is illustrated the electrical circuit of the present invention. An alternating current power source, such as a 115-volt, 60-cycle per second, power source, is applied to the input terminal 11 and 13. Terminal 11 is connected to terminal 15 and terminal 13 is connected to terminal 17 of main power switch 19. Terminals 21 and 23 are applied to opposite sides of electric fan motor 25. Terminal 23 is connected to one side of current limiting resistor 27, to terminal 29 of relay 31 and to terminal 33 of pushbutton switch 35. Terminal 34 of pushbutton switch 35 is connected to one end of relay coil 37. Terminal 21 is connected to one side of neon lamp 39, to the other end of relay coil 37 and to terminal 41 of relay 31. Relay 31 includes an elongated core 32 i as indicated by dotted lines. One end of the elongated core is operatively associated with relay coil 37 and the other end is connected to switching elements 42 and 44. Terminals 43 and 45 are respectively applied to opposite ends of primary winding 47 of transformer 49.

Terminal 51 of secondary winding 52 is connected to the cathode of diode 53 and terminal 54 of the secondary winding is connected to prod 55. The anode of diode 53 is connected to one end of shunt 57 and the other end of shunt 57 is connected to prod 59. Ammeter 61 is connected across the terminals of shunt 61 to measure the current flow through the prods 55 and 59 when they are operatively connected to the material being examined.

Figure 2:
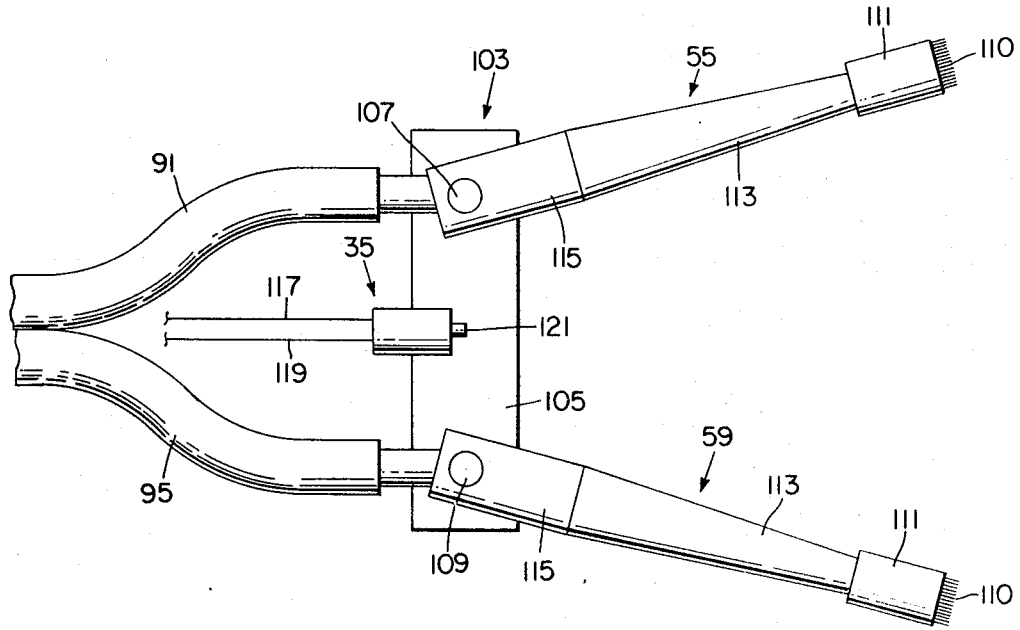
FIG. 2 is an illustration of the prod element of the present invention.

In FIG. 2 is shown a more detailed illustration of prod element 103 including prods 55 and 59 and pushbutton switch 35. Prods 55 and 59 are respectively connected to support member 105, which is made of dielectric material, by means of fastening members 107 and 109. Also connected to fastening members 107 and 109 are heavy gage electrical conductors 91 and 95, respectively. Prod 55 comprises heavy gage electrical conducting braided wire 110 that is covered by sleeve 111 which is made of electrical conducting material. The narrow end of tapered electrical conducting rod 113 is connected to braided wire 110 and to sleeve 111. The broad end of tapered rod 113 is flattened out to form a base connecting plate 115. The base connecting plate 115 is pivotally mounted on support member 105 by fastening member 107. Base connecting plate 115 has a friction fit with fastening member 105 so that it may be pivoted about member 107 by the use of sufficient force. However, the friction fit prevents prod 55 from jarring loose from its position after it has been pivoted into the desired position. Braided wire 110 extends from the end of sleeve 111 and this extending braided wire is used to physically contact the material to be tested. It has been found that this short extension of braided wire from sleeve 111 provides a very effective method for providing a good electrical connection between the prod and the material, especially when large currents are involved requiring the exertion of substantial force of the braided wire against the material being tested. Prod 59 is the same as prod 55 and will therefore not be described.

The wires 117 and 119, leading to pushbutton switch 35, are covered with dielectric material and may be wrapped in physical contact with heavy gage electrical conductors 91 and 95. Pushbutton switch 35 is positioned adjacent to the center part of dielectric support member 105 so that the operator of the equipment can easily and conveniently apply current to prods 55 and 59 by pressing button 121 of pushbutton switch 35.

Figure 3:
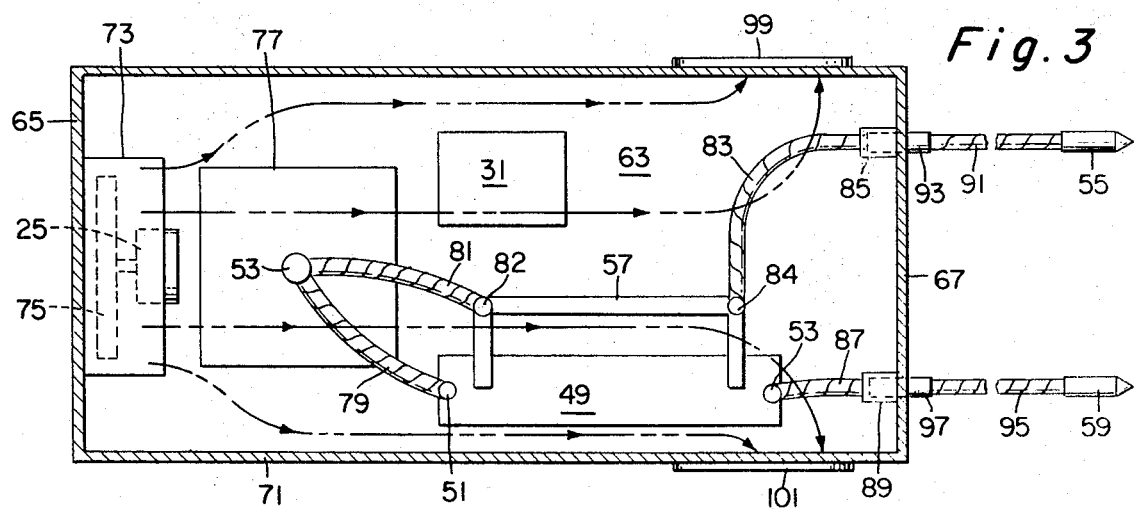
FIG. 3 is a schematic diagram of the physical positioning of the components of the present invention.

In FIG. 3 is illustrated the position of the various components of the magnetic inspection device. In FIG. 3 is also shown the enclosure having a bottom panel 63, top panel (not shown), rear panel 65, front panel 67 and side panels 69 and 71. Mounted on rear panel 65 is motor-fan housing 73 and mounted therein is motor 25 and fan 75. Housing 73 has an open passage for air which is drawn through an opening provided in rear panel 65 and is blown over motor 25 and over diode housing 77 which is mounted directly behind housing 73. Diode housing 77 includes cooling fins (not shown) and mounted near its center is diode 53. Mounted behind diode housing 77 is relay 31, transformer 49 and shunt 57. A heavy gage electrical conductor 79 is connected between the cathode of diode 53 and terminal 51 of transformer 49. A heavy gage electrical conductor 81 is connected between the anode of diode 53 and terminal 82 of shunt 57. Heavy gage electrical conductor 83 connects terminal 84 of shunt 57 to female terminal 85 and heavy gage electrical conductor 87 is connected from terminal 53 of transformer 79 to female terminal 89. Heavy gage electrical conductor 91 is connected between male terminal 93 and prod 55 and heavy gage electrical conductor 95 is connected between male terminal 97 and prod 59.

From FIG. 3 it can be seen that housing 77, relay 31, transformer 49, shunt 57 and heavy gage conductors 79, 81, 83, and 87 are positioned such that cooling air, as indicated by the broken arrows, uniformly flows over the components to bring about maximum effective cooling. Louvers 99 and 101 are respectively provided in the front region of side panels 69 and 71 so that the heated exhaust air may pass therethrough after having cooled the previously described components.

Typical operation of the previously described magnetic inspection device is as follows. The operator applies power to the device by closing switch 19 which is mounted on front panel 67 (not shown) of the device. The operator then adjusts the position of prods 55 and 59 and braided wires 110 of the prods against the material to be tested. The operator then presses button 121 of switch 35 for a period of from 2—15 seconds, for example, depending upon the currents used and the type of materials being examined. When button 121 is being pushed, causing switch 35 to close, relay coil 37 is actuated which causes relay 31 to close. This causes AC current to pass through primary winding 47 of transformer 49. The secondary winding has inducted therein an AC signal that has a stepdown in voltage and a step-up in current as compared to the primary winding. Diode 53 permits only the pulsating DC portion of the AC current in the secondary winding to pass to prods 55 and 59. This pulsating DC signal is then passed through the prods and through the material being tested that is between the prods. While current is passing through the material, the operator applies magnetic particles to the material being tested and removes the excess by blowing with a hand bulb air applicator, for example. The magnetic particles are typically powered iron filings that are dyed for color contrast with the material being tested. Then the current is stopped by releasing button 121 which causes switch 35 to open. The pattern of the magnetic particles on the material being tested is then examined to determine if there are any flaws in the material. Typically, the signal passing through the prods is at about 400 amps and 4.4 volts. However, this will vary primarily depending upon the resistance of the material between the prods. The typical magnetic particle pattern occupies an area about 4 inches long and 2 inches wide.

In FIGS. 4 through 8 is illustrated another embodiment of the enclosure and the components of the present invention. The enclosure includes a bottom panel 125, top panel 127, rear panel 129, front panel 131, and side panels 133 and 135. Mounted on the lower side of bottom panel 125 are shock mounts 137. Mounted on rear panel 129 is male power receptacle 139 and motor fan housing 141 which has mounted therein a motor and fan (not shown) for cooling the various electrical components. Housing 141 has an open passage for air which is drawn through opening 143 of rear panel 129 and is blown over the fan motor and over diode housing 145 which is mounted directly behind housing 141. Diode housing 141 includes cooling fins (not shown) and mounted on support member 147 near its center is diode 149. Transformer 151 and shunt 153 are traversely mounted behind diode housing 141 so that they will receive maximum cooling effect from the circulating air. Relay 155 is offset from the main airflow path since it does not need as much heat dissipation as do the diode, transformer and shunt. Heavy gage electrical cables are used for conducting current where large currents are involved.

Figure 4:
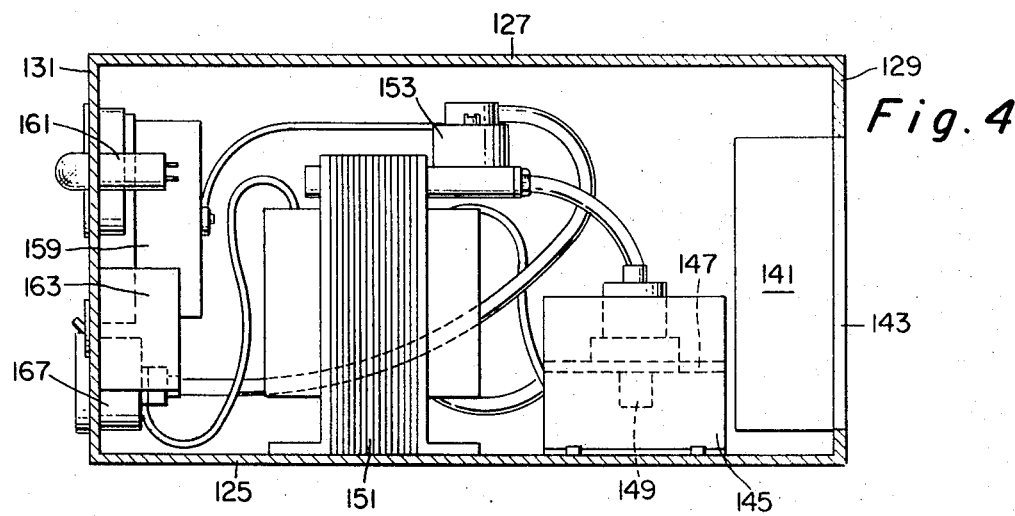
FIG. 4 is an illustration of the physical positioning of the components of another embodiment of the present invention.
Figure 5:
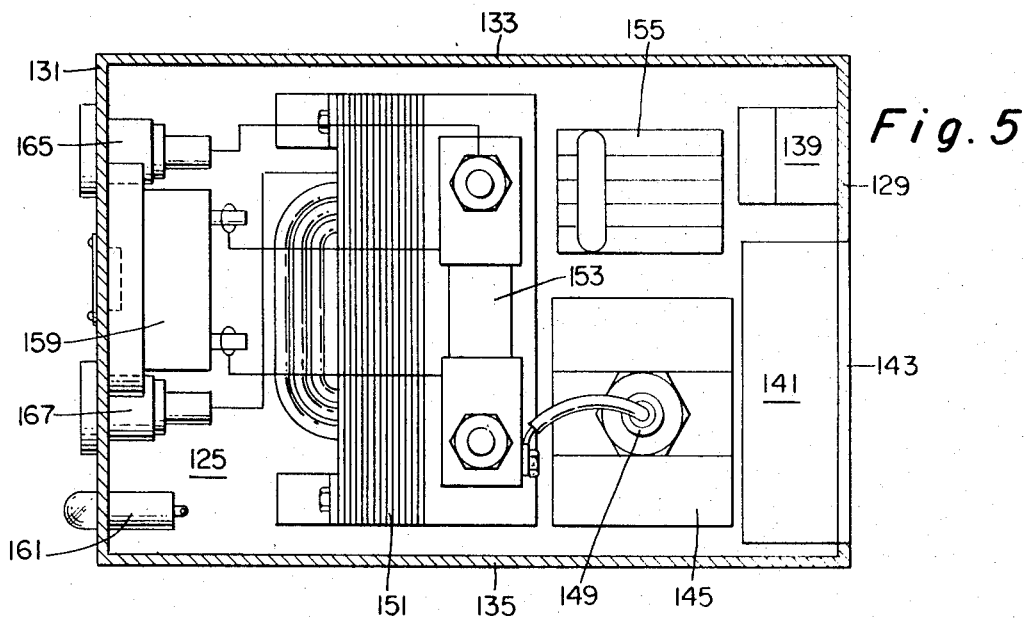
FIG. 5 is a top elevation of FIG. 4.
Figure 6:
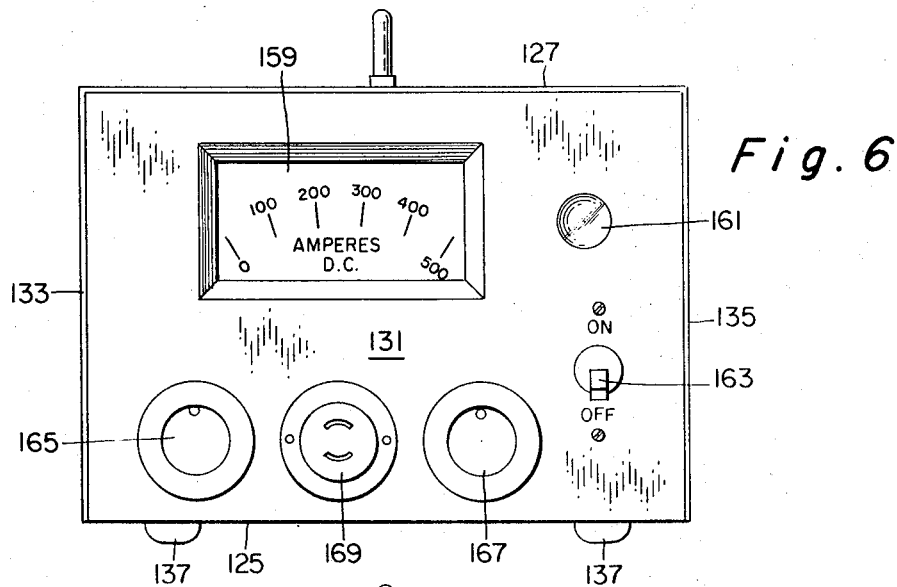
FIG. 6 is a front view of FIG. 4 showing the front panel.
Figure 7:
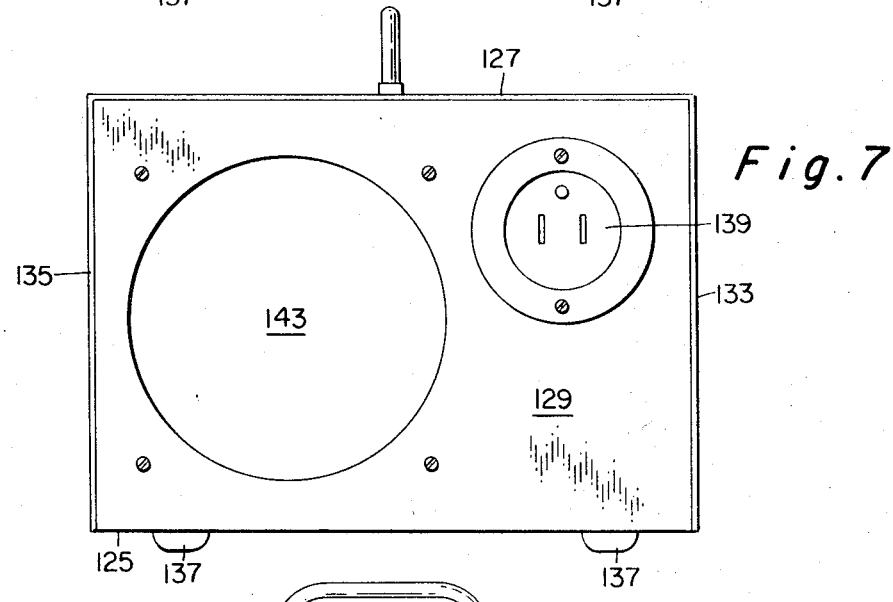
FIG. 7 is a rear view of FIG. 4 showing the rear panel.
Figure 8:
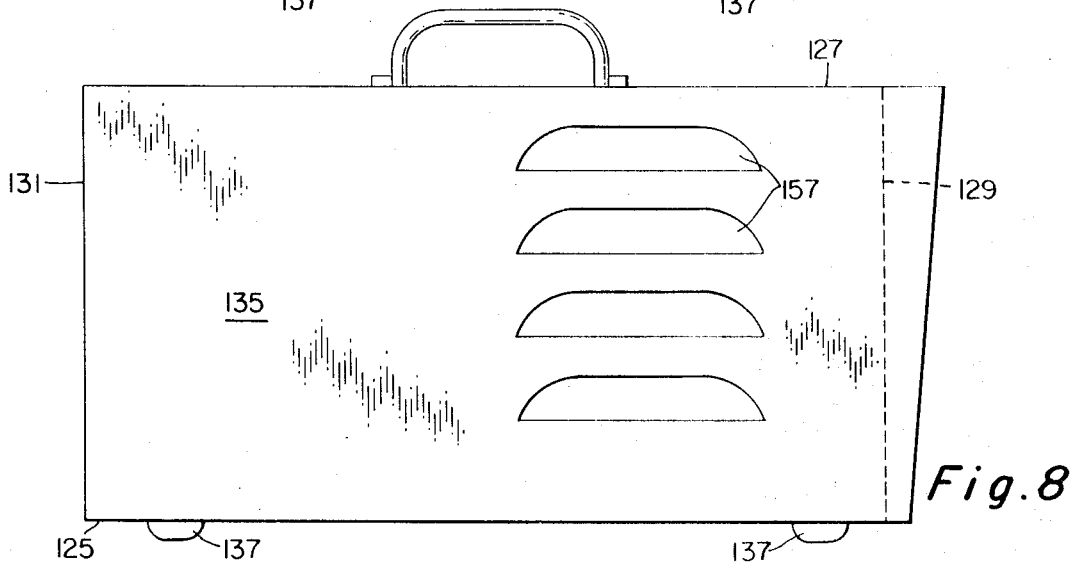
FIG. 8 is a side view of FIG. 4 showing the side panel.

From FIGS. 4 and 5 it can be seen that diode housing 145, transformer 151, shunt 153, relay 155, and the heavy gage conductors are positioned such that cooling air passes over the components to bring about the most effective cooling as required by each of the components. As shown in FIG. 8 louvers 157 are provided in the front region of side panels 133 and 135 so that the heated exhaust air may pass therethrough after having cooled the previously described components.

Mounted on front panel 131 is ammeter 159, pilot light 161, main power switch 163, two female connectors 165 and 167 for connection with the male connectors of the heavy gage cable of probes 55 and 59. Also provided on front panel 131 is remote control connector 169 which is used to provide a convenient disconnect point for wires 117 and 119 leading to pushbutton switch 35.

The operation of the embodiment shown in FIGS. 4 through 8 is similar to that described in reference to FIGS. 1 through 3.

Obviously many modifications and variations of the present invention are possible in the light of the above teachings. It is therefore to be understood that within the scope of the appended claims the invention may be practiced otherwise than as specifically described.

What we claim is:

1. A portable magnetic testing apparatus for converting alternating current to a low voltage high amperage direct current, said apparatus comprising:

first and second power terminals for being operatively connected to an alternating current source;

a transformer having a single primary winding and a single secondary winding;

said primary winding having first and second terminals;

a first conductor connecting said first power terminal and said first terminal of said primary winding;

first and second switches operatively connected in series in said first conductor;

a second conductor connecting said second power terminal and said second terminal of said primary winding;

third and fourth switches operatively connected in series in said second conductor;

said first and third switches being operatively interconnected and said second and fourth switches being operatively interconnected;

a relay having a relay coil and an elongated core, one end of said elongated core being operatively connected to said second and fourth switches and the other end of said elongated core being operatively associated with said relay coil;

a third conductor operatively connecting one end of said relay coil and said first conductor at a position between said first and second switches;

a fourth conductor operatively connecting the other end of said relay coil to one terminal of a pushbutton switch and a fifth conductor operatively connecting the other terminal of said pushbutton switch and said second conductor at a position between said third and fourth switches;

first and second prods;

said single secondary winding having first and second terminals;

a sixth conductor connecting said first terminal of said single secondary winding to said first prod;

a single diode;

a seventh conductor operatively connecting said second terminal of said single secondary winding to the cathode of said diode;

an eighth conductor operatively connecting the anode of said diode to said second prod; and said first and second prods being mounted in fixed spaced relation on a handle and said pushbutton switch being operatively connected to said handle between said fist and second prods;

each of said prods comprising electrical conducting braided wires that are partially covered by a sleeve of electrical conducting material, the braided wire of each of said prods extending beyond one end of said each of said sleeves, the other end of each of said sleeves is flattened and pivotally mounted on said handle;

a housing having an air inlet opening and a cooling means, said cooling means comprising a fan and motor positioned adjacent said inlet opening for drawing air through said inlet opening and discharging it into said housing, said rectifier comprising a diode mounted in a diode housing having cooling fins, said diode and diode housing positioned directly behind said fan and in the path of the air discharged from said fan, said transformer and relay positioned behind said diode housing and parallel with respect to the airflow path after it has cooled said diode and diode housing and louvers positioned in said housing at the end opposite from said air inlet opening for discharging the cooling air after it has cooled said diode, diode housing, transformer and relay.